United States Patent [19]

Shimada et al.

[11] Patent Number: 4,500,355
[45] Date of Patent: Feb. 19, 1985

[54] AQUEOUS INK COMPOSITION

[75] Inventors: Masaru Shimada, Shizuoka; Masaomi Sasaki, Susono, both of Japan

[73] Assignee: Ricoh Company, Ltd., Tokyo, Japan

[21] Appl. No.: 536,928

[22] Filed: Sep. 28, 1983

[30] Foreign Application Priority Data

Oct. 29, 1982 [JP] Japan .................... 57-189203

[51] Int. Cl.³ ............................................. C09D 11/02
[52] U.S. Cl. ......................................... 106/22; 106/20
[58] Field of Search .................................. 106/20, 22

[56] References Cited

U.S. PATENT DOCUMENTS 4,365,998 12/1982 Sugiyama et al. .................... 106/22

FOREIGN PATENT DOCUMENTS 1526017 9/1978 United Kingdom .

Primary Examiner—A. Lionel Clingman
Assistant Examiner—Amelia B. Yarbrough
Attorney, Agent, or Firm—Flynn, Thiel, Boutell & Tanis

[57] ABSTRACT

An aqueous ink composition for general use and for ink-jet printing which comprises, as its main components at least one dye selected from the group consisting of a cyan azo dye, a megenta azo dye and a yellow azo dye and a humectant.

12 Claims, No Drawings

AQUEOUS INK COMPOSITION

BACKGROUND OF THE INVENTION

The present invention relates to an aqueous ink composition suitable for use as printing ink and stamping ink in general use, and for use with writing instruments, recording apparatus or the like. More particularly, the present invention relates to an aqueous ink composition for ink-jet printing, which is capable of yielding printed images with high quality (i.e., high clearness and sharpness, etc.), and with excellent resistance to water and light, and which is also capable of providing stable ink ejection, without causing the plugging of the nozzles of the ink-jet printing apparatus, even if it is used continuously for a long period of time or it is used intermittently after a period of non-use of the ink-jet printing apparatus.

Generally, an aqueous ink comprises as the main components a dye, water and a humectant consisting of a polyhydric alcohol or an ether thereof. In particular, an aqueous ink for use in ink-jet printing should satisfy the following conditions in order to yield an excellent print:

First, in order that the ink be compatible with ink droplet formation and control of the direction of the ejected ink droplet streams, it is necessary that its viscosity, surface tension, specific electric conductivity, and density each fall within certain appropriate ranges.

Second, it is necessary that no precipitates be separated, due to coagulation, precipitation, chemical change of slightly soluble components or other causes, from the ink during an extended period of continuous use or storage, or during the periods when the apparatus is not in use. Nor should the physical properties of the ink otherwise change during the above-mentioned periods. If the separated solid components or viscous materials in the ink become affixed around the nozzles, or if the physical properties of the ink change, deviating from the predetermined physical properties achieved at the time of the preparation, the desired printing quality, the desired ink ejection stability, and the desired ink ejection response cannot be obtained.

Third, it is desired that the ink provide adequately high contrast and clearness in the printed image.

Fourth, it is necessary that the ink for ink-jet printing be such that the printed images are resistant to water, light and physical wear.

Fifth, it is necessary that the images printed by the ink dry rapidly.

So far, many proposals have been made for an ink for ink-jet printing, but from the viewpoint of practical use, a satisfactory ink which is capable of meeting the above-described requirements has not been found.

As the dyes for use in the conventional black aqueous inks, for example, direct dyes such as C.I. Direct Black $-2$, $-4$, $-17$, $-19$, $-22$, $-32$, $-38$, $-51$, $-56$, $-62$, $-71$, $-74$, $-75$, $-77$, $-105$, $-108$, $-112$ and $-154$; and acid dyes such as C.I. Acid Black $-1$, $-2$, $-7$, $-24$ and $-94$ are employed in practice.

As the dyes for use in the conventional cyan inks, for example, direct dyes such as C.I. Direct Blue $-1$, $-8$, $-71$, $-76$, $-78$, $-108$, $-163$, $-195$, $-202$, and $-236$; and acid dyes such as C.I. Acid Blue $-1$, $-7$, $-126$, $-175$, and $-234$ are employed.

As the dyes for use in the conventional magenta inks, for example, direct dyes such as C.I. Direct Red $-1$, $-11$, $-37$, $-62$, $-75$, $-83$, $-99$, $-220$ and $-227$; acid dyes such as C.I. Acid Red $-87$, $-92$, $-94$, $-115$, $-131$, $-154$, $-186$ and $-254$ are employed.

As the dyes for use in the conventional yellow inks, for example, direct dyes such as C.I. Direct Yellow $-12$, $-27$, $-33$, $-39$, $-50$, $-58$, $-85$, $-86$, $-88$, $-100$ and $-110$; and acid dyes such as C.I. Acid Yellow $-7$, $-17$, $-23$, $-29$, $-42$, and $-99$ are employed.

Of the above-mentioned dyes for the conventional aqueous inks, the solubility of the direct dyes in the solvent employed in the inks is so low that the concentration of the dye cannot be increased. The result is that the ink cannot provide images with high density and high contrast. Furthermore, even if the concentration of the direct dye in the ink is held down, the dye precipitates from the ink during an extend period of storage, or during the periods when the ink-jet printing apparatus is not in use. As a result, the nozzles are plugged with the precipitates and it becomes impossble to obtain the desired ink ejection stability and the desired ink ejection response.

In order to make improvement on the above-described shortcomings of the conventional aqueous inks, there have been proposed a method of adding a dye-dissolving agent such as dimethylformamide, pyrrolidone, ethanolamine or a surface active agent, or a method of adding a large amount of a humectant to the ink. These agents, when added, bring about the following problems. The amines, for example, corrode the metallic materials employed in the ink-jet printing apparatus. By the addition of a surface active agent, foams are formed in the ink, by which the quality of printed images is decreased. When a large amount of a humectant is contained in the ink, the drying speed of the printed images is significantly decreased, and special paper with high ink-absorbing properties has to be employed in order to overcome this shortcoming.

Furthermore, the conventional azo dyes, which are polyazo dyes, have the shortcoming that they are contaminated with impurities, such as diazonium decomposition materials, diazonium amines, unreacted monazonium compounds and disazo compounds, which are contained in the azo dyes in the course of a number of reaction steps involved in the production of the polyazo dyes.

Aqueous inks employing the conventional acid dyes provide images with clear color tone. However, images printed by the aqueous inks are not resistant to water, and special paper has to be employed in order to eliminate this shortcoming.

In order to eliminate the above-described shortcomings, and in order to obtain an aqueous ink which satisfies the previously described conditions, there has been a keen demand for a dye which has excellent solubility in the solvent of the ink, and is capable of yielding printed images which are resistant to water, light and physical wear, and in which substantially no impurities are contained.

SUMMARY OF THE INVENTION

It is therefore an object of the present invention to provide an aqueous ink composition for ink-jet printing completely satisfying the above outlined conditions. That is to say, the object of the present invention is to provide an aqueous ink composition for ink-jet printing which does not result in plugging of the nozzles, and does not change in quality or separate precipitates therefrom with time during storage, but exhibits excellent ink-ejection stability, and has good ink ejection response, shows slight changes in physical properties, if any, when used for a long period with continuous recirculation, or when used intermittently, and, yields printed images which are non-spreading, and have superior water resistance, high sharpness, and high image density.

According to the present invention, the above object can be attained by an aqueous ink composition for inkjet printing which comprises as its main components (i) at least one dye selected from the group consisting of a cyan azo dye of formula (I), a magenta azo dye of formula (II), and a yellow azo dye of formula (III), (ii) a humectant, and (iii) water. The azo dyes of the formulae (I) through (III) are excellent in solubility and can be obtained in high purity.

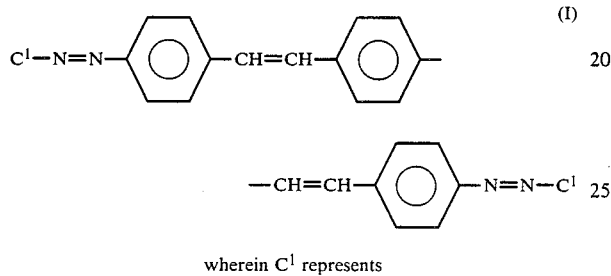

wherein $C^1$ represents

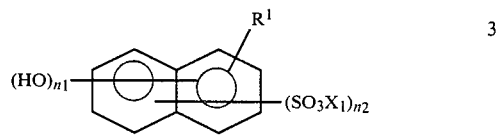

wherein $R^1$ represents hydrogen, an unsubstituted or substituted amino group, a sulfo-group-substituted alkyl carbamoyl group, a sulfo-group-substituted phenyl carbamoyl group or a sulfo-group-substituted naphthyl carbamoyl group; $X^1$ represents hydrogen, Na, K, Li or an organic amine; $n_1$ is an integer of 1 or 2; and $n_2$ is an integer of 0 through 3.

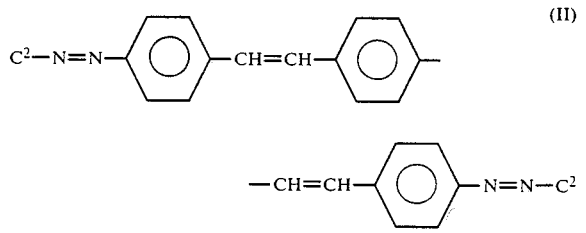

-continued
wherein $C^2$ represents

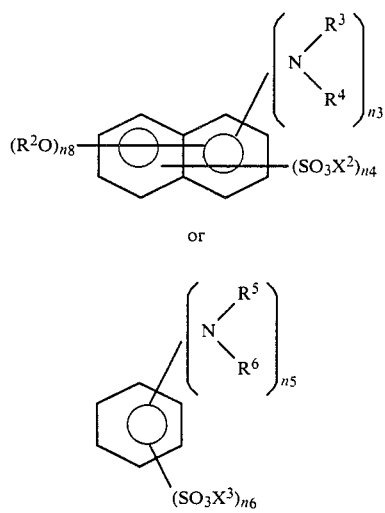

wherein $R^2$ represents hydrogen or an alkyl group; $R^3$ and $R^4$ independently represent hydrogen, an alkyl group, an acyl group, an unsubstituted or substituted phenyl group, or an unsubstituted or substituted phenylsulfonyl group; $R^5$ and $R^6$ independently represent hydrogen or an alkyl group; $X^2$ and $X^3$ independently represent hydrogen, Na, K, Li or an organic amine; $n_3$, $n_5$ and $n_6$ each are an integer of 1 or 2; $n_8$ is an integer of 0 or 1 and $n_4$ is an integer of 1 through 3.

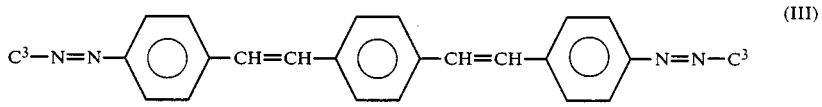

wherein $C^3$ represents

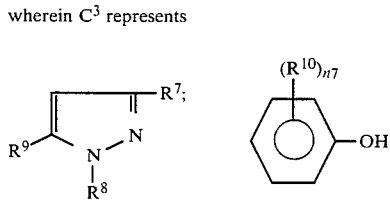

or Ar-NHCOCHR$^{11}$ wherein $R^7$ represents an alkyl group, an unsubstituted or substituted phenyl group, a cyano group, a hydroxyl group, an alkoxy group, an amino group, an acylamino group, an anilino group, an ureido group, a carbamoyl group, a carboxyl group or an alkyl ester of a carboxyl group; $R^8$ represents an alkyl group or an unsubstituted or substituted phenyl group; $R^9$ represents a hydroxyl group or an amino group; $R^{10}$ represents hydrogen, an alkyl group, an alkoxy group, a hydroxyl group, halogen or a carboxyl group; $R^{11}$ represents an acetyl group, a benzoyl group, a carboxyl group, an alkyl ester of a carboxyl group, a cyano group, or an amido group; Ar represents a sulfo-group-substituted phenyl group or naphthyl group; and $n_7$ is an integer of 0 through 3.

DETAILED DESCRIPTION OF THE PREFERRED EMBODIMENTS

According to the present invention, the above described dyes can be used individually or in combination, so that not only blue, red, yellow and black inks, but also inks with a variety of colors can be obtained as desired. More specifically, the dye of the formula (I) provides a blue ink, the dye of the formula (II) provides a red ink, and the dye of the formula (III) provides a yellow ink. By use of any two of the three dyes or three of them, inks in colors between any two of them and a black ink can be obtained as desired. As a matter of course, dyes covered by the same general formula can also be employed in combination.

The aqueous ink composition according to the present invention provides clear printed images with high quality which are resistant to water and to light (i.e., the images do not fade when exposed to light). Furthermore, since the dyes employed in the present invention are excellent in solubility, no precipitates are separated from the aqueous ink composition during an extended period of continuous use or storage, or during the periods when the ink-jet printing apparatus is not in use, so that the plugging of the nozzles of the ink-jet printing apparatus is not caused.

The following are specific examples of the dyes for use in the present invention. As a matter of course, the present invention is not limited to those dyes with respect to the use of dye.

Examples of Cyan Azo Dyes of Formula (I) (A1 through A15)

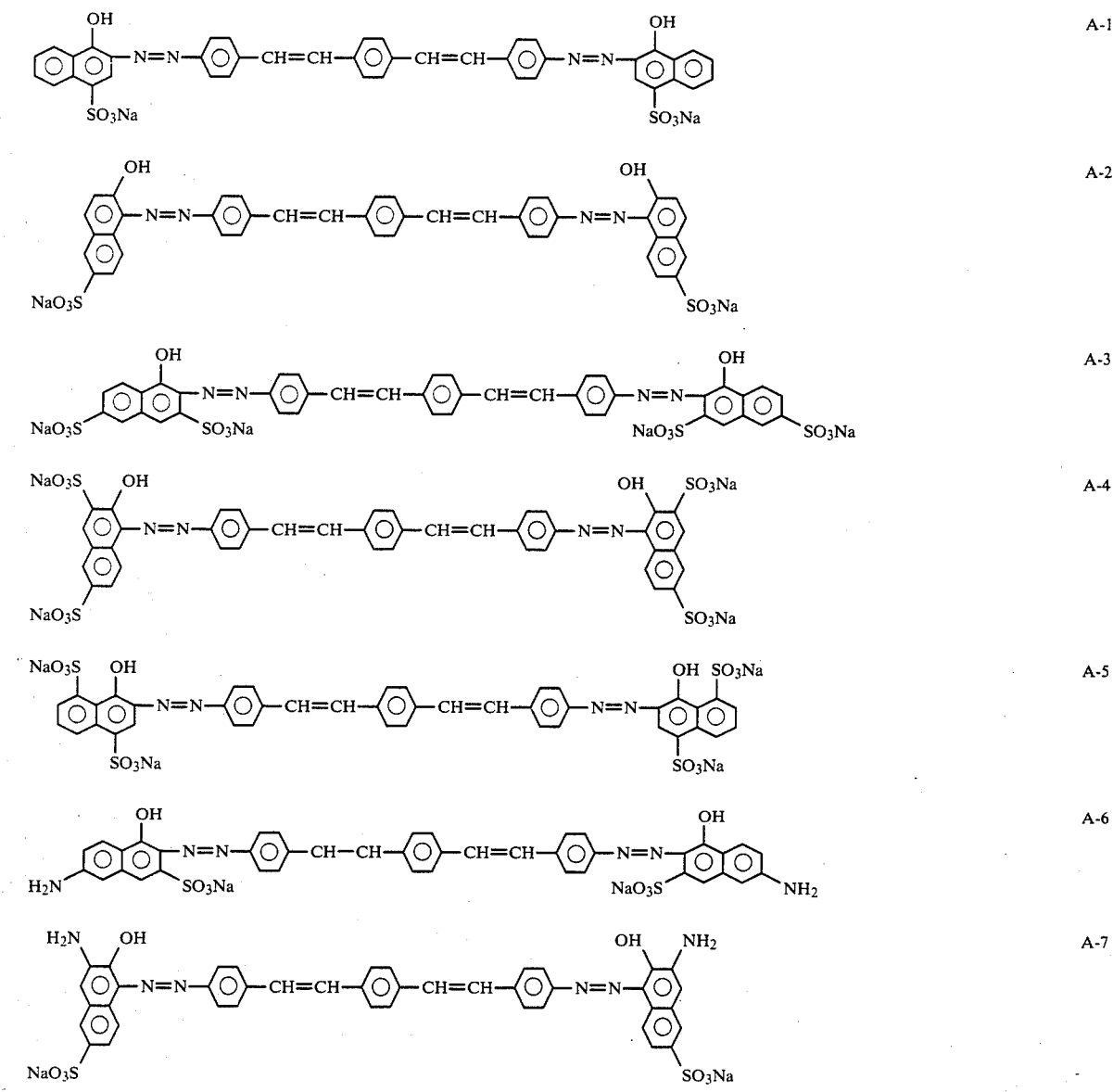

-continued
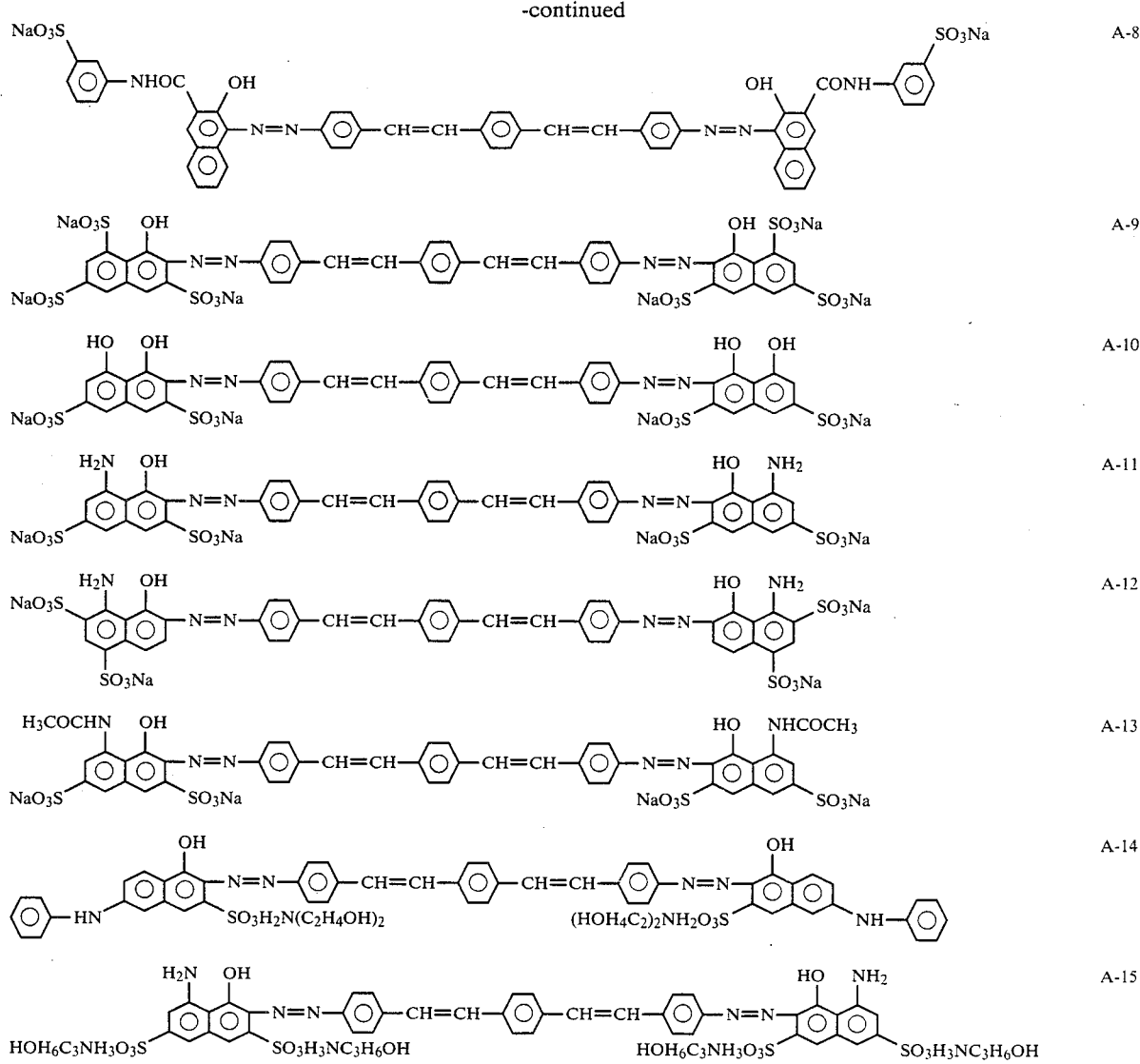
Examples of Magenta Azo Dyes of Formula (II) (B1 through B15)
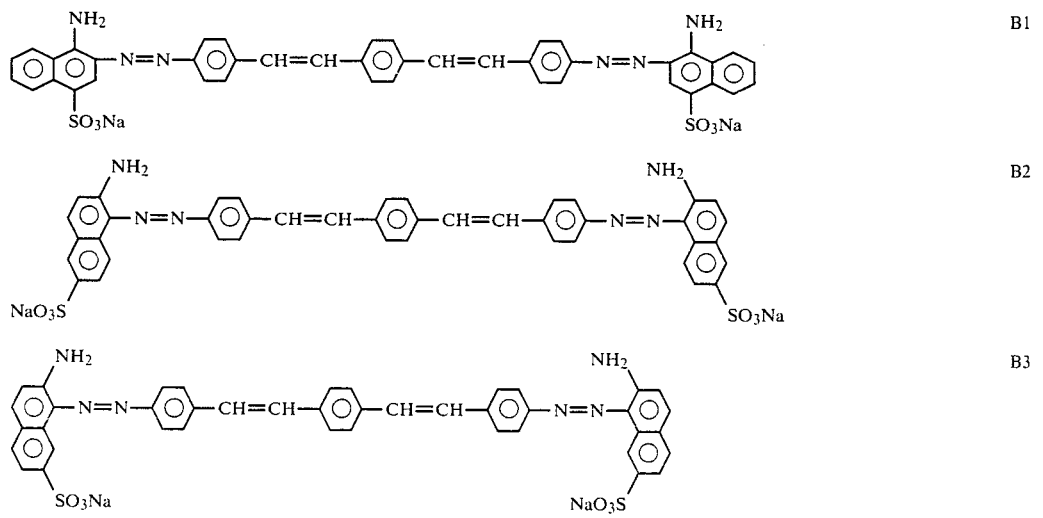

-continued
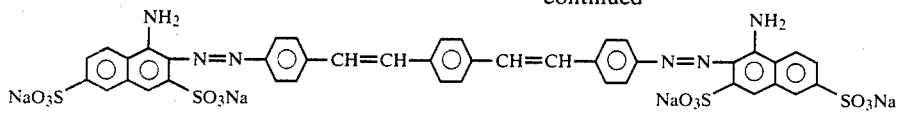 B4
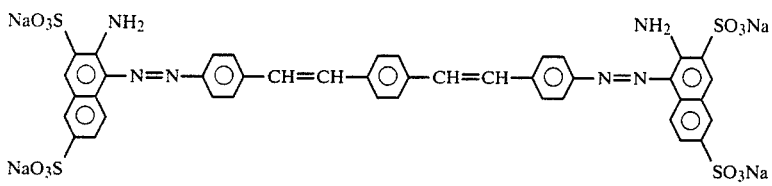 B5
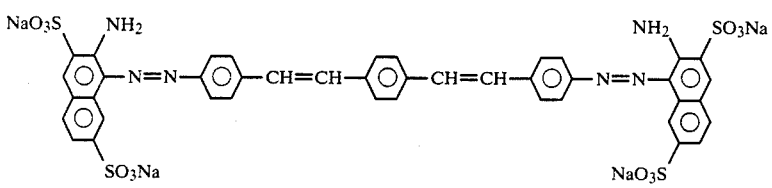 B6
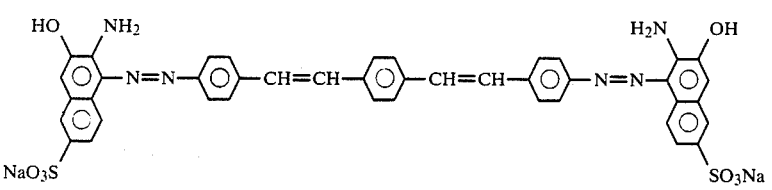 B7
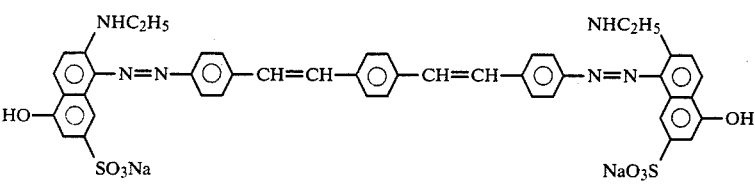 B8
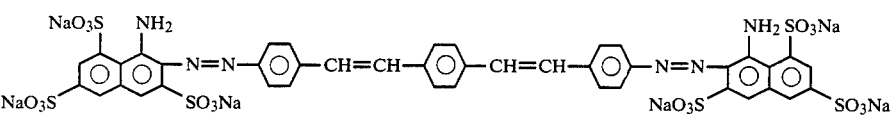 B9
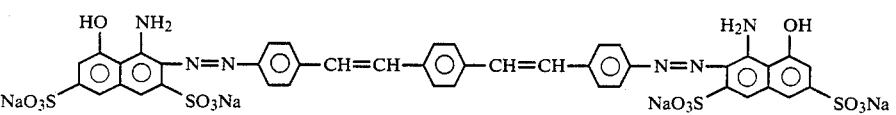 B10
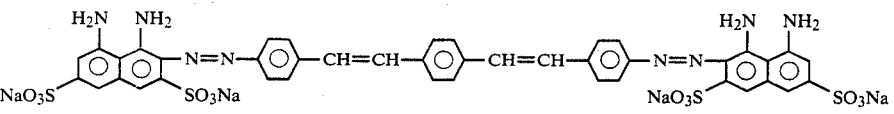 B11
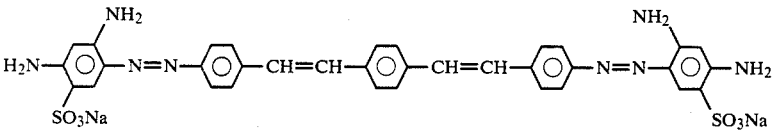 B12
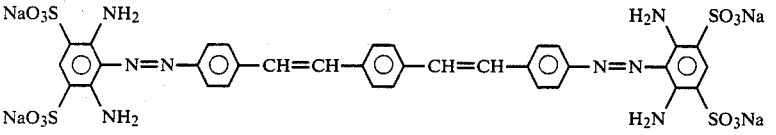 B13
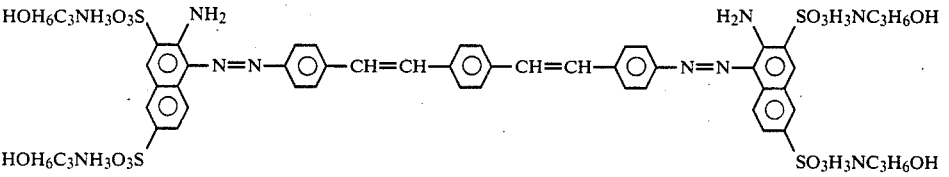 B14

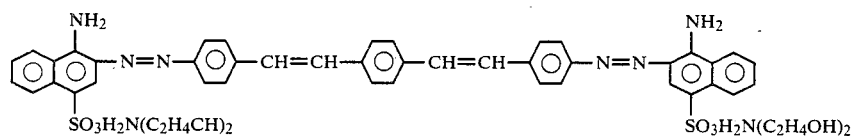
B15
Examples of Yellow Azo Dyes of Formula (III) (C1 through C12)
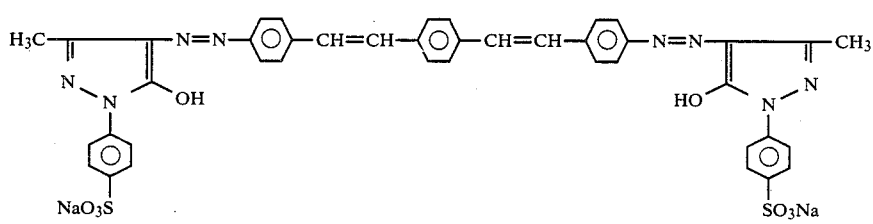
C1
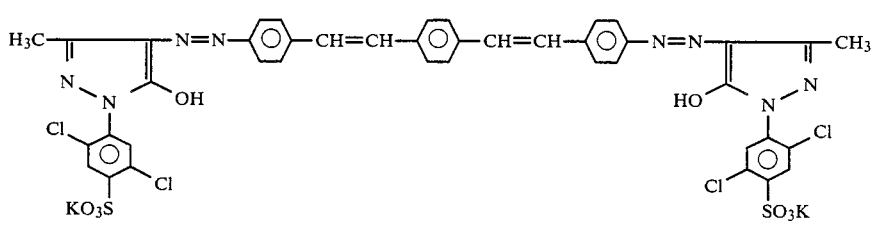
C2
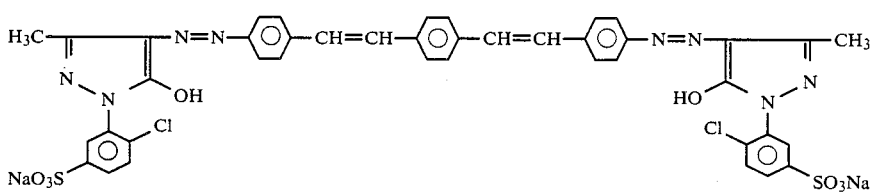
C3
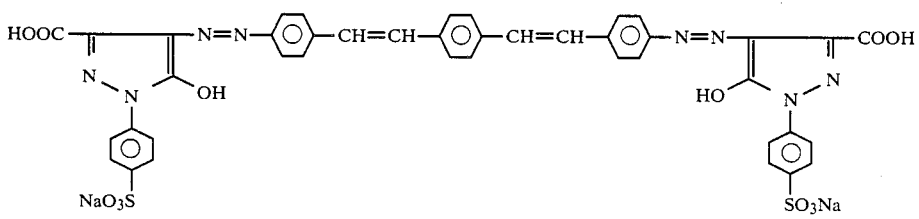
C4
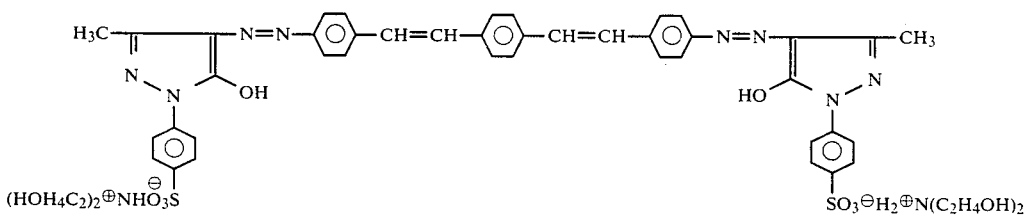
C5
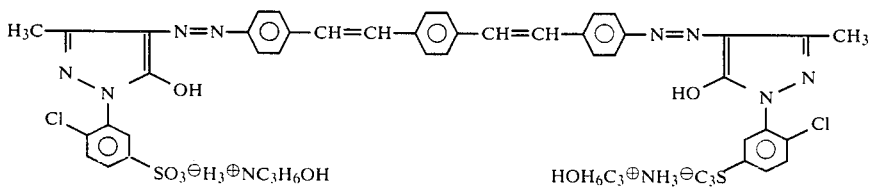
C6
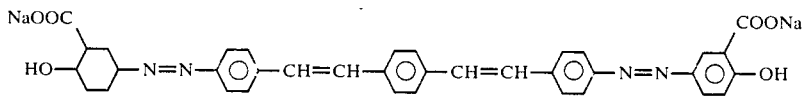
C7

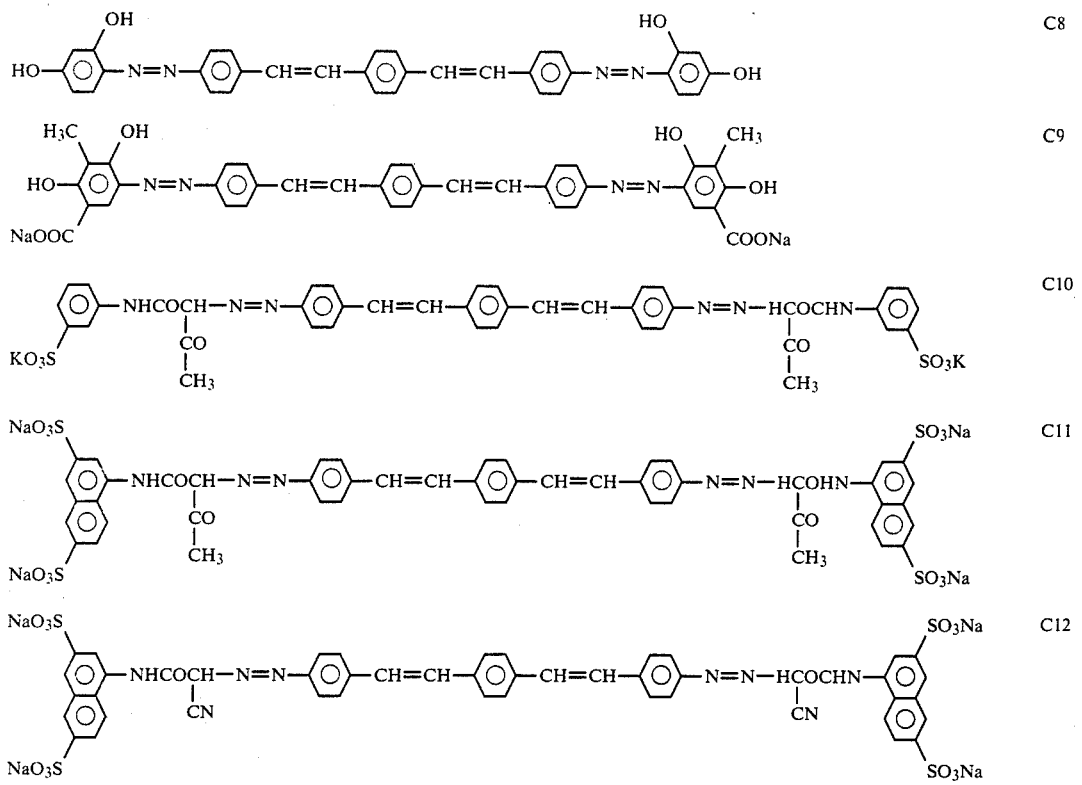

The above dyes can be synthesized, for example, by referring to the procedures described in Japanese Laid-Open Patent Application Serial No. 53-133229. In particular, the magenta dyes can be prepared by a coupling reaction in the presence of an acid.

In the present invention, it is preferable that the dye be contained in an amount of 0.5 to 5 parts by weight with respect to 100 parts by weight of the ink composition according to the present invention. When the amount of the dye is less than 0.5 part by weight, the dye does not sufficiently work as a colorant, while when the amount of the dye exceeds 5 parts by weight, it precipitates during an extended period of continuous use and storage, or during the periods when the ink-jet printing apparatus is not in use. As a result, the nozzles are plugged with the precipitates and it becomes impossible to eject the ink droplets from the nozzles.

When necessary, the following black dyes, cyan dyes, magenta dyes and yellow dyes can be used in combination with the above-described dyes for use in the present invention:

As the black dyes, for example, direct dyes such as C.I. Direct Black −2, −4, −17, −19, −22, −32, −38, −51, −56, −62, −71, −74, −75, −77, −105, −108, −112 and −154; and acid dyes such as C.I. Acid Black −1, −2, −7, −24 and −94 are employed in practice.

As the cyan dyes, for example, direct dyes such as C.I. Direct Blue −1, −8, −71, −76, −78, −108, −163, −195, −202, and −236; and acid dyes such as C.I. Acid Blue −1, −7, −126, −175 and −234 are employed.

As the magenta dyes, for example, direct dyes such as C.I. Direct Red −1, −11, −37, −62, −75, −83, −99, −220 and −227; and acid dyes such as C.I. Acid Red −87, −92, −94, −115, −131, −154, −186 and −254 are employed.

As the yellow dyes, for example, direct dyes such as C.I. Direct Yellow −12, −27, −33, −39, −50, −58, −85, −86, −88, −100 and −110; and acid dyes such as C.I. Yellow −7, −17, −23, −29, −42, and −99 are employed.

As the humectant for use in the present invention, a polyhydric alcohol or an ether thereof can be employed.

Specific examples of the humectant are as follows:
Ethylene glycol,
diethylene glycol,
triethylene glycol,
propylene glycol,
glycerin,
polyethylene glycol,
thiodiethanol,
ethylene glycol monoethyl ether,
ethylene glycol monobutyl ether,
diethylene glycol monomethyl ether,
diethylene glycol monoethyl ether,
diethylene glycol monobutyl ether,
triethylene glycol monomethyl ether,
triethylene glycol monoethyl ether.

It is preferable that that the humectant be empolyed in an amount of 5 to 30 parts by weight with respect to 100 parts by weight of the ink composition according to the present invention. The above humectants can be employed alone or in combination.

Furthermore, an anti-mold agent can be added to the aqueous ink composition according to the present invention.

Examples of an anti-mold agent for use in the present invention are as follows:

Sodium dehydroacetate,
2,2-dimethyl-6-acetoxydioxane-1,3-sodium benzoate,
sodium thiosulfate, and
ammonium thioglycolate.

By referring to the following examples, preferred embodiments of an aqueous ink composition according to the present invention will now be explained, together with comparative examples thereof.

EXAMPLE 1

A mixture of the following components was heated to 50° C. and stirred until completely dissolved. The mixture was then filtered through a Teflon filter with a 0.22 μm mesh to yield an embodiment No. 1 of an aqueous ink composition according to the present invention.

|  | wt. % |
|---|---|
| Dye A9 | 2.5 |
| Dye C1 | 1.0 |
| Glycerin | 5.0 |
| Diethylene glycol | 13.0 |
| Sodium dehydroacetate | 0.2 |
| Ion-exchanged water | 78.3 |

The properties of the thus prepared aqueous ink composition were:

| pH = 10.1 | (25° C.) |
|---|---|
| Viscosity = 2.05 cP | (25° C.) |
| Surface tension = 51.8 dynes/cm | (25° C.) |

The aqueous ink composition No. 1 was then subjected to the following performance tests:

(1) Image Clarity and Image Dryness Test

The ink composition was caused to issure from a nozzle with an inner diameter of 30 μm, with vibrations at a frequency of 100 KHz, by which vibrations the ink composition was ejected in a stream broken into individual drops, and was then caused to impinge on commercially available high quality paper. As a result, clear image without spreading were obtained on the paper. The time required for drying the printed image was not more than 10 seconds at normal room temperature and humidity.

(2) Preservability Tests

Samples of the ink composition were tightly sealed in glass containers and subjected to the following storage tests:
 a. Preserved for 1 month at −20° C.;
 b. Preserved for 1 month at 4° C.;
 c. Preserved for 1 year at 20° C. and
 d. Preserved for 1 week at 90° C.

Separation of precipitates from the ink composition was not observed at all in storage. In addition, no changes were detected in the properties or color of the ink composition.

(3) Ink Droplet Ejection Stability Test

The ink-jet printing as was done in the above described Image clarity and Image Dryness Test was continuously performed for 1,000 hours. There was no evidence of either clogging of the nozzle or change in ejection direction of the ink droplets; rather, stable printing was maintained.

(4) Ink Droplet Ejection Response Test

After ink-jet printing was performed as outlined in (1), the apparatus and ink composition were allowed to stand for two monthes at room temperature and humidity, after which they were used again to perform ink-jet printing under the same conditions as previously stated in (1). As in (3) above, there was no change in the ink driplet ejection stability.

The above test was repeated in the same manner, except that the apparatus and ink composition were allowed to stand for one week at 40° C., 30% RH, instead of being allowed to stand for one month at room temperature and humidity. The result was that again no change was observed in the ink droplet ejection stability.

EXAMPLE 2

With the following formulation, an embodiment No. 2 of an aqueous ink composition according to the present invention was prepared by the same procedure as in Example 1.

|  | wt. % |
|---|---|
| Dye A9 | 2.8 |
| Dye B4 | 0.2 |
| Dye C2 | 0.5 |
| Glycerin | 5.0 |
| Diethylene glycol | 13.0 |
| Sodium dehydroacetate | 0.2 |
| Ion-exchanged water | 78.3 |

The properties of the thus prepared aqueous ink composition were:

| pH = 10.3 | (25° C.) |
|---|---|
| Viscosity = 2.05 cP | (25° C.) |
| Surface tension = 51.5 dynes/cm | (25° C.) |

EXAMPLE 3

With the following formulation, an embodiment No. 3 of an aqueous ink composition according to the present invention was prepared by the same procedure as in Example 1.

|  | wt. % |
|---|---|
| Dye A10 | 2.5 |
| Dye C1 | 0.5 |
| C.I. Direct Black 19 | 0.5 |
| Glycerin | 5.0 |
| Diethylene glycol | 13.0 |
| Sodium dehydroacetate | 0.2 |
| Ion-exchanged water | 78.3 |

The properties of the thus prepared aqueous ink composition were:

| pH = 10.3 | (25° C.) |
|---|---|
| Viscosity = 2.12 cP | (25° C.) |
| Surface tension = 50.5 dynes/cm | (25° C.) |

EXAMPLE 4

With the following formulation, an embodiment No. 4 of an aqueous ink composition according to the present invention was prepared by the same procedure as in Example 1.

|  | wt. % |
| --- | --- |
| Dye A12 | 3.0 |
| Dye B9 | 0.2 |
| Dye C4 | 0.6 |
| Polyethylene glycol 200 | 15.0 |
| Triethylene glycol monomethyl ether | 3.0 |
| p-Ethoxybenzoic acid | 0.2 |
| Ion-exchanged water | 78.0 |

The properties of the thus prepared aqueous ink composition were:

| pH = 10.2 | (25° C.) |
| --- | --- |
| Viscosity = 2.10 cP | (25° C.) |
| Surface tension = 51.2 dynes/cm | (25° C.) |

EXAMPLE 5

With the following formulaion, an embodiment No. 5 of an aqueous ink composition according to the present invention was prepared by the same procedure as in Example 1.

|  | wt. % |
| --- | --- |
| Dye A15 | 2.5 |
| Dye B14 | 0.1 |
| Dye C5 | 0.6 |
| Polyethylene glycol 200 | 15.0 |
| Triethylene glycol monomethyl ether | 3.0 |
| p-Ethoxybenzoic acid | 0.2 |
| Ion-exchanged water | 78.6 |

The properties of the thus prepared aqueous ink composition were:

| pH = 9.9 | (25° C.) |
| --- | --- |
| Viscosity = 2.15 cP | (25° C.) |
| Surface tension = 50.5 dynes/cm | (25° C.) |

EXAMPLE 6

With the following formulation, an embodiment No. 6 of an aqueous ink composition according to the present invention was prepared by the same procedure as in Example 1.

|  | wt. % |
| --- | --- |
| Dye A15 | 2.8 |
| Dye C5 | 0.9 |
| Polyethylene glycol 200 | 15.0 |
| Triethylene glycol monomethyl ether | 3.0 |
| p-Ethoxybenzoic acid | 0.2 |
| Ion-exchanged water | 78.1 |

The properties of the thus prepared aqueous ink composition were:

| pH = 9.5 | (25° C.) |
| --- | --- |
| Viscosity = 2.10 cP | (25° C.) |
| Surface tension = 50.1 dynes/cm | (25° C.) |

COMPARATIVE EXAMPLE 1

With the following formulation, a compartive ink composition No. 1 was prepared by the same procedure as in Example 1.

|  | wt. % |
| --- | --- |
| Dye (C.I. Direct Blue 78) | 2.8 |
| Dye (C.I. Direct Red 220) | 0.2 |
| Dye (C.I. Direct Yellow 85) | 0.5 |
| Glycerin | 5.0 |
| Diethylene glycol | 13.0 |
| Sodium dehydroacetate | 0.2 |
| Ion-exchanged water | 78.3 |

The properties of the thus prepared comparative aqueous ink composition were:

| pH = 10.2 | (25° C.) |
| --- | --- |
| Viscosity = 2.08 cP | (25° C.) |
| Surface tension = 51.5 dynes/cm | (25° C.) |

COMPARATIVE EXAMPLE 2

With the following formulation, a comparative ink composition No. 2 was prepared by the same procedure as in Example 1.

|  | wt. % |
| --- | --- |
| Dye (C.I. Direct Blue 108) | 2.5 |
| Dye (C.I. Direct Red 99) | 0.5 |
| Dye (C.I. Direct Yellow 27) | 0.5 |
| Glycerin | 5.0 |
| Diethylene glycol | 13.0 |
| Sodium dehydroacetate | 0.2 |
| Ion-exchanged water | 78.3 |

The properties of the thus prepared comparative aqueous ink composition were:

| pH = 10.3 | (25° C.) |
| --- | --- |
| Viscosity = 2.10 cP | (25° C.) |
| Surface tension = 50.8 dynes/cm | (25° C.) |

COMPARATIVE EXAMPLE 3

With the following formulation, a comparative ink composition No. 3 was prepared by the same procedure as in Example 1.

|  | wt. % |
| --- | --- |
| Dye (C.I. Direct Blue 202) | 3.0 |
| Dye (C.I. Direct Red 220) | 0.2 |
| Dye (C.I. Direct Yellow 88) | 0.6 |
| Polyethylene glycol 200 | 15.0 |
| Triethylene glycol monomethyl ether | 3.0 |
| p-Ethoxybenzoic acid | 0.2 |
| Ion-exchanged water | 78.0 |

The properties of the thus prepared comparative aqueous ink composition were:

| pH = 10.2 | (25° C.) |
| --- | --- |
| Viscosity = 2.12 cP | (25° C.) |
| Surface tension = 51.0 dynes/cm | (25° C.) |

Examples 2 through 6 and Compartive Examples 1 through 3 were subjected to the same ink droplet ejection response tests as were done in Example 1. With respect to Example 2 through 6, the same excellent results were obtained as in Example 1. However, in Comparative Examples 1 through 3, the nozzles became partially clogged when the apparatus and ink composition were allowed to stand at normal room temperature and humidity for one week, and when the apparatus and ink composition were allowed to stand at 40° C./30%RH for 3 days, so that the direction of ejected ink droplets became extremely unstable and normal ink-jet printing was impossible.

EXAMPLE 7

A mixture of the following components was heated to 50° C. and stirred until completely dissolved. The mixture was filtered through a Teflon filter with a 0.22 μm mesh to yield an embodiment No. 7 of an aqueous ink composition according to the present invention:

|  | wt. % |
| --- | --- |
| Dye A3 | 3.0 |
| Glycerin | 5.0 |
| Diethylene glycol | 13.0 |
| Sodium dehydroacetate | 0.2 |
| Ion-exchanged water | 78.8 |

The properties of the thus prepared aqueous ink composition were:

| pH = 10.3 | (25° C.) |
| --- | --- |
| Viscosity = 2.15 cP | (25° C.) |
| Surface tension = 50.5 dynes/cm | (25° C.) |

This aqueous ink composition was then subjected to the following performance tests:

(1) Image Clarity and Image Dryness Test

The ink composition was caused to issue from a nozzle with an inner diameter of 30 μm, with vibrations at a frequency of 100 KHz, by which vibrations the ink composition was ejected in a stream broken into individual drops, and was then caused to impinge on commercially available high quality paper. As a result, clear images were obtained on the paper. The time required for drying the printed image was not more than 10 seconds at normal room temperature and humidity.

(2) Preservability Tests

Samples of the ink composition were tightly sealed in glass containers and subjected to the following storage tests:
a. Preserved for 1 monthe at −20° C.;
b. Preserved for 1 month at 4° C.;
c. Preserved for 1 year at 20° C.;
d. Preserved for 1 week at 90° C.

Separation of precipitates from the ink composition was not observed at all in storage. In addition, no changes were detected in the properties or color of the ink composition.

(3) Ink Droplet Ejection Stability Test

The ink-jet printing as was done in the above described Image Clarity and Image Dryness Test was continuously performed for 1,000 hours. There was no evidence of either clogging of the nozzle or change in ejection direction of the ink droplets; rather, stable printing was maintained.

(4) Ink Droplet Ejection Response Test

After ink-jet printing was performed as outlined in (1), the apparatus and ink composition were allowed to stand for two months at room temperature and humidity, after which they were used again to perform ink-jet printing under the same conditions as previously stated in (1). As in (3) above, there was no change in the ink droplet ejection stability.

The above test was repeated in the same manner, except that the apparatus and ink composition were allowed to stand for one week at 40° C., 30% RH, instead of being allowed to stand for one month at room temperature and humidity. The result was that again no change was observed in the ink droplet ejection stability.

EXAMPLE 8

With the following formulation, an embodiment No. 8 of an aqueous ink composition according to the present invention was prepared by the same procedure as in Example 7.

|  | wt. % |
| --- | --- |
| Dye A4 | 3.5 |
| Glycerin | 5.0 |
| Diethylene glycol | 13.0 |
| Sodium dehydroacetate | 0.2 |
| Ion-exchanged water | 78.3 |

The properties of the thus prepared aqueous ink composition were:

| pH = 10.2 | (25° C.) |
| --- | --- |
| Viscosity = 2.02 cP | (25° C.) |
| Surface tension = 51.6 dynes/cm | (25° C.) |

EXAMPLE 9

With the following formulation, an embodiment No 9 of an aqueous ink composition according to the present invention was prepared by the same procedure as in Example 8.

|  | wt. % |
| --- | --- |
| Dye A9 | 4.0 |
| Glycerin | 5.0 |
| Diethylene glycol | 13.0 |
| Sodium dehydroacetate | 0.2 |
| Ion-exchanged water | 77.8 |

The properties of the thus prepared aqueous ink composition were:

| pH = 10.2 | (25° C.) |
| --- | --- |
| Viscosity = 2.11 cP | (25° C.) |
| Surface tension = 52.4 dynes/cm | (25° C.) |

EXAMPLE 10

With the following formulation, an embodiment No. 10 of an aqueous ink composition according to the present inventin was prepared by the same procedure as in Example 9.

| | wt. % |
|---|---|
| Dye A10 | 3.0 |
| Polyethylene glycol 200 | 15.0 |
| Triethylene glycol monomethyl ether | 3.0 |
| p-Ethoxybenzoic acid | 0.2 |
| Ion-exchanged water | 78.8 |

The properties of the thus prepared aqueous ink composition were:

| pH = 10.2 | (25° C.) |
|---|---|
| Viscosity = 2.05 cP | (25° C.) |
| Surface tension = 51.3 dynes/cm | (25° C.) |

EXAMPLE 11

With the following formulation, an embodiment No. 11 of an aqueous ink composition according to the present invention was prepared by the same procedure as in Example 10.

| | wt. % |
|---|---|
| Dye A11 | 3.5 |
| Polyethylene glycol 200 | 15.0 |
| Triethylene glycol monomethyl ether | 3.0 |
| p-Ethoxybenzoic acid | 0.2 |
| Ion-exchanged water | 78.3 |

The properties of the thus prepared aqueous ink composition were:

| pH = 10.2 | (25° C.) |
|---|---|
| Viscosity = 2.10 cP | (25° C.) |
| Surface tension = 50.8 dynes/cm | (25° C.) |

EXAMPLE 12

With the following formulation, an embodiment No. 12 of an aqueous ink composition according to the present invention was prepared by the same procedure as in Example 11.

| | wt. % |
|---|---|
| Dye A12 | 4.0 |
| Polyethylene glycol 200 | 15.0 |
| Triethylene glycol monomethyl ether | 3.0 |
| p-Ethoxybenzoic acid | 0.2 |
| Ion-exchanged water | 77.8 |

The properties of the thus prepared aqueous ink composition were:

| pH = 10.0 | (25° C.) |
|---|---|
| Viscosity = 2.08 cP | (25° C.) |
| Surface tension = 51.0 dynes/cm | (25° C.) |

EXAMPLE 13

With the following formulation, an embodiment No. 13 of an aqueous ink composition according to the present invention was prepared by the same procedure as in Example 12.

| | wt. % |
|---|---|
| Dye A13 | 3.5 |
| Triethylene glycol monomethyl ether | 20.0 |
| 6-acetoxy-2,4-dimethyl-m-dioxane | 0.1 |
| Sodium ethylenediaminetetracetate | 0.1 |
| Ion-exchanged water | 76.3 |

The properties of the thus prepared aqueous ink composition were:

| pH = 10.1 | (25° C.) |
|---|---|
| Viscosity = 2.08 cP | (25° C.) |
| Surface tension = 50.6 dynes/cm | (25° C.) |

EXAMPLE 14

With the following formulation, an embodiment No. 14 of an aqueous ink composition according to the present invention was prepared by the same procedure as in Example 13.

| | wt. % |
|---|---|
| Dye A14 | 4.0 |
| Triethylene glycol monomethyl ether | 20.0 |
| 6-acetoxy-2,4-dimethyl-m-dioxane | 0.1 |
| Sodium ethylenediaminetetraacetate | 0.1 |
| Ion-exchanged water | 75.8 |

The properties of the thus prepared aqueous ink composition were:

| pH = 9.5 | (25° C.) |
|---|---|
| Viscosity = 2.25 cP | (25° C.) |
| Surface tension = 48.5 dynes/cm | (25° C.) |

EXAMPLE 15

With the following formulation, an embodiment No. 15 of an aqueous ink composition according to the present invention was prepared by the same procedure as in Example 14

| | wt. % |
|---|---|
| Dye A15 | 4.0 |
| Polyethylene glycol 200 | 15.0 |
| Thiodiethanol | 5.0 |
| Sodium dehydroacetate | 0.2 |
| Ion-exchanged water | 75.8 |

The properties of the thus prepared aqueous ink composition were:

| pH = 9.6 | (25° C.) |
|---|---|
| Viscosity = 2.20 cP | (25° C.) |
| Surface tension = 49.3 dynes/cm | (25° C.) |

COMPARATIVE EXAMPLE 4

With the following formulation, a comparative ink composition No. 4 was prepared by the same procedure as in Example 7.

|  | wt. % |
| --- | --- |
| Dye (C.I. Direct Blue 78) | 3.0 |
| Glycerin | 5.0 |
| Diethylene glycol | 13.0 |
| Sodium dehydroacetate | 0.2 |
| Ion-exchanged water | 78.8 |

The properties of the thus prepared comparative aqueous ink composition were:

| pH = 10.2 | (25° C.) |
| --- | --- |
| Viscosity = 2.16 cP | (25° C.) |
| Surface tension = 50.5 dynes/cm | (25° C.) |

COMPARATIVE EXAMPLE 5

With the following formulation, a comparative ink composition No. 5 was prepared by the same procedure as in Example 7.

|  | wt. % |
| --- | --- |
| Dye (C.I. Direct Blue 163) | 3.5 |
| Glycerin | 5.0 |
| Diethylene glycol | 13.0 |
| Sodium dehydroacetate | 0.2 |
| Ion-exchanged water | 78.3 |

The properties of the thus prepared comparative aqueous ink composition were:

| pH = 10.2 | (25° C.) |
| --- | --- |
| Viscosity = 2.21 cP | (25° C.) |
| Surface tension = 51.8 dynes/cm | (25° C.) |

COMPARATIVE EXAMPLE 6

With the following formulation, a comparative ink composition No. 6 was prepared by the same procedure as in Example 7.

|  | wt. % |
| --- | --- |
| Dye (C.I. Direct Blue 202) | 3.0 |
| Polyethylene glycol 200 | 15.0 |
| Triethylene glycol monomethyl ether | 3.0 |
| p-Ethoxybenzoic acid | 0.2 |
| Ion-exchanged water | 78.8 |

The properties of the thus prepared comparative aqueous ink composition were:

| pH = 10.2 | (25° C.) |
| --- | --- |
| Viscosity = 2.18 cP | (25° C.) |
| Surface tension = 50.5 dynes/cm | (25° C.) |

COMPARATIVE EXAMPLE 7

With the following formulation, a comparative ink composition No. 7 was prepared by the same procedure as in Comparative Example 7.

|  | wt. % |
| --- | --- |
| Dye (C.I. Acid Blue 234) | 3.5 |
| Polyethylene glycol 200 | 15.0 |

-continued

|  | wt. % |
| --- | --- |
| Triethylene glycol monomethyl ether | 3.0 |
| p-Ethoxybenzoic acid | 0.2 |
| Ion-exchanged water | 78.3 |

The properties of the thus prepared comparative aqueous ink compositin were:

| pH = 10.3 | (25° C.) |
| --- | --- |
| Viscosity = 2.02 cP | (25° C.) |
| Surface tension = 52.6 dynes/cm | (25°.C.) |

Examples 8 through 15 and Comparative Examples 4 through 7 were subjected to the same ink droplet ejection response tests as were done in Example 7. With respect to Example 8 through 15, the same excellent results were obtained as in Example 7. However, in Comparative Examples 4 through 7, the nozzles became partially clogged when the apparatus and ink composition were allowed to stand at normal room temperature and humidity for one week, and when the apparatus and ink composition were allowed to stand at 40° C./30%RH for 3 days, so that the direction of ejected ink droplets became extremely unstable and normal ink-jet printing was impossible.

EXAMPLE 16

A mixture of the following components was heated to 50° C. and stirred until completely dissolved. The mixture was then filtered through a teflon filter with a 0.22 μm mesh to yield an embodiment No. 16 of an aqueous ink composition according to the present invention:

|  | wt. % |
| --- | --- |
| Dye B1 | 3.0 |
| Glycerin | 5.0 |
| Diethylene glycol | 13.0 |
| Sodium dehydroacetate | 0.2 |
| Ion-exchanged water | 78.8 |

The properties of the thus prepared aqueous ink composition were:

| pH = 10.1 | (25° C.) |
| --- | --- |
| Viscosity = 2.10 cP | (25° C.) |
| Surface tension = 49.8 dynes/cm | (25° C.) |

This aqueous ink composition was then subjected to the following performance tests:

(1) Image Clarity and Image Dryness Test

The ink composition was caused to issue from a nozzle with an inner diameter of 30 μm, with vibrations at a frequency of 100 KHz, by which vibrations the ink composition was ejected in a stream broken into individual drops, and was then caused to impinge on commercially available high quality paper. As a result, clear images were obtained on the paper. The time required for drying the printed image was not more than 10 seconds at normal room temperature and humidity.

(2) Preservability Tests

Samples of the ink composition were tightly sealed in glass containers and subjected to the following storage tests:

a. Preserved for 1 month at −20° C.;
b. Preserved for 1 month at 4° C.;
c. Preserved for 1 year at 20° C. and
d. Preserved for 1 week at 90° C.

Separation of precipitates from the ink composition was not observed at all in storage. In addition, no changes were detected in the properties or color of the ink composition.

(3) Ink Droplet Ejection Stability Test

The ink-jet printing as was done in the above described Image Clarity and Image Dryness Test was continuously performed for 1,000 hours. There was no evidence of either clogging of the nozzle or change in ejection direction of the ink droplets; rather, stable printing was maintained.

(4) Ink Droplet Ejection Response Test

After ink-jet printing was performed as outlined in (1), the apparatus and ink composition were allowed to stand for two months at room temperature and humidity, after which they were used again to perform ink-jet printing under the same conditions as previously stated in (1). As in (3) above, there was no change in the ink droplet ejection stability.

The above test was repeated in the same manner, except that the apparatus and ink composition were allowed to stand for one week at 40° C., 30%RH, instead of being allowed to stand for one month at room temperature and humidity. The result was that again no change was observed in the ink droplet ejection stability.

EXAMPLE 17

With the following formulation, an embodiment No. 17 of an aqueous ink composition according to the present invention was prepared by the same procedure as in Example 16.

|  | wt. % |
|---|---|
| Dye B4 | 3.5 |
| Glycerin | 5.0 |
| Diethylene glycol | 13.0 |
| Sodium dehydroacetate | 0.2 |
| Ion-exchanged water | 78.3 |

The properties of the thus prepared aqueous ink composition were:

| pH = 10.1 | (25° C.) |
|---|---|
| Viscosity = 2.14 cP | (25° C.) |
| Surface tension = 50.0 dynes/cm | (25° C.) |

EXAMPLE 18

With the following formulation, an embodiment No. 18 of an aqueous ink compositin according to the present invention ws prepared by the same procedure as in Example 16.

|  | wt. % |
|---|---|
| Dye B5 | 4.0 |
| Glycerin | 5.0 |
| Diethylene glycol | 13.0 |
| Sodium dehydroacetate | 0.2 |
| Ion-exchanged water | 77.8 |

The properties of the thus prepared aqueous ink composition were:

| pH = 10.2 | (25° C.) |
|---|---|
| Viscosity = 2.15 cP | (25° C.) |
| Surface tension = 50.7 dynes/cm | (25° C.) |

EXAMPLE 19

With the following formulation, an embodiment No. 19 of an aqueous ink composition according to the present invention was prepared by the same procedure as in Example 16.

|  | wt. % |
|---|---|
| Dye B7 | 3.0 |
| Polyethylene glycol 200 | 15.0 |
| Triethylene glycol monomethyl ether | 3.0 |
| p-Ethoxybenzoic acid | 0.2 |
| Ion-exchanged water | 78.8 |

The properties of the thus prepared aqueous ink composition were:

| pH = 10.5 | (25° C.) |
|---|---|
| Viscosity = 2.15 cP | (25° C.) |
| Surface tension = 48.8 dynes/cm | (25° C.) |

EXAMPLE 20

With the following formulation, an embodiment No. 20 of an aqueous ink composition according to the present invention was prepared by the same procedure as in Example 16.

|  | wt. % |
|---|---|
| Dye B9 | 3.5 |
| Polyethylene glycol 200 | 15.0 |
| Triethylene glycol monomethyl ether | 3.0 |
| p-Ethoxybenzoic acid | 0.2 |
| Ion-exchanged water | 78.3 |

The properties of the thus prepared aqueous ink composition were:

| pH = 10.2 | (25° C.) |
|---|---|
| Viscosity = 2.18 cP | (25° C.) |
| Surface tension = 52.3 dynes/cm | (25° C.) |

EXAMPLE 21

With the following formulation, an embodiment No. 21 of an aqueous ink composition according to the present invention was prepared by the same procedure as in Example 16.

|  | wt. % |
|---|---|
| Dye B11 | 4.0 |
| Polyethylene glycol 200 | 15.0 |
| Triethylene glycol monomethyl ether | 3.0 |
| p-Ethoxybenzoic acid | 0.2 |
| Ion-exchanged water | 78.3 |

The properties of the thus prepared aqueous ink composition were:

| pH = 10.2 | (25° C.) |
|---|---|
| Viscosity = 2.05 cP | (25° C.) |
| Surface tension = 51.8 dynes/cm | (25° C.) |

EXAMPLE 22

With the following formulation, an embodiment No. 22 of an aqueous ink composition according to the present invention was prepared by the same procedure as in Example 16.

|  | wt. % |
|---|---|
| Dye B12 | 3.5 |
| Triethylene glycol monomethyl ether | 20.0 |
| 6-acetoxy-2,4-dimethyl-m-dioxane | 0.1 |
| Sodium ethylenediaminetetraacetate | 0.1 |
| Ion-exchanged water | 76.3 |

The properties of the thus prepared aqueous ink composition were:

| pH = 10.1 | (25° C.) |
|---|---|
| Viscosity = 2.02 cP | (25° C.) |
| Surface tension = 51.8 dynes/cm | (25° C.) |

EXAMPLE 23

With the following formulation, an embodiment No. 23 of an aqueous ink composition according to the present invention was prepared by the same procedure as in Example 16.

|  | wt. % |
|---|---|
| Dye B14 | 4.0 |
| Triethylene glycol monomethyl ether | 20.0 |
| 6-acetoxy-2,4-dimethyl-m-dioxane | 0.1 |
| Sodium ethylenediaminetetraacetate | 0.1 |
| Ion-exchanged water | 75.8 |

The properties of the thus prepared aqueous ink composition were:

| pH = 9.8 | (25° C.) |
|---|---|
| Viscosity = 2.18 cP | (25° C.) |
| Surface tension = 49.0 dynes/cm | (25° C.) |

EXAMPLE 24

With the following formulation, an embodiment No. 24 of an aqueous ink composition according to the present invention was prepared by the same procedure as in Example 16.

|  | wt. % |
|---|---|
| Dye B15 | 4.0 |
| Polyethylene glycol 200 | 15.0 |
| Thiodiethanol | 5.0 |
| Sodium dehydroacetate | 0.2 |
| Ion-exchanged water | 75.8 |

The properties of the thus prepared aqueous composition ink were:

| pH = 9.6 | (25° C.) |
|---|---|
| Viscosity = 2.20 cP | (25° C.) |
| Surface tension = 49.5 dynes/cm | (25° C.) |

COMPARATIVE EXAMPLE 8

With the following formulation, a comparative ink composition No. 8 was prepared by the same procedure as in Example 16.

|  | wt. % |
|---|---|
| Dye (C.I. Direct Red 11) | 3.0 |
| Glycerin | 5.0 |
| Diethylene glycol | 13.0 |
| Sodium dehydroacetate | 0.2 |
| Ion-exchanged water | 78.8 |

The properties of the thus prepared comparative aqueous ink composition were:

| pH = 10.0 | (25° C.) |
|---|---|
| Viscosity = 2.24 cP | (25° C.) |
| Surface tension = 50.5 dynes/cm | (25° C.) |

COMPARATIVE EXAMPLE 9

With the following formulation, a comparative ink composition No. 9 was prepared by the same procedure as in Example 16.

|  | wt. % |
|---|---|
| Dye (C.I. Direct Red 99) | 3.5 |
| Glycerin | 5.0 |
| Diethylene glycol | 13.0 |
| Sodium dehydroacetate | 0.2 |
| Ion-exchanged water | 78.3 |

The properties of the thus prepared comparative aqueous ink composition were:

| pH = 10.2 | (25° C.) |
|---|---|
| Viscosity = 2.08 cP | (25° C.) |
| Surface tension = 51.5 dynes/cm | (25° C.) | cl COMPARATIVE EXAMPLE 10

With the following formulation, a comparative ink composition No. 10 was prepared by the same procedure as in Example 16.

|  | wt. % |
|---|---|
| Dye (C.I. Acid Red 92) | 3.0 |
| Polyethylene glycol 200 | 15.0 |
| Triethylene glycol monomethyl ether | 3.0 |
| p-Ethoxybenzoic acid | 0.2 |

| | wt. % |
|---|---|
| Ion-exchanged water | 78.8 |

The properties of the thus prepared comparative aqueous ink composition were:

| | | |
|---|---|---|
| pH = 10.0 | (25° C.) | |
| Viscosity = 2.02 cP | (25° C.) | |
| Surface tension = 52.3 dynes/cm | (25° C.) | |

COMPARATIVE EXAMPLE 11

With the following formulation, a comparative ink composition No. 11 was preared by the same procedure as in Example 16.

| | wt. % |
|---|---|
| Dye (C.I. Acid Red 94) | 3.5 |
| Polyethylene glycol 200 | 15.0 |
| Triethylene glycol monomethyl ether | 3.0 |
| p-Ethoxybenzoic acid | 0.2 |
| Ion-exchanged water | 78.3 |

The properties of the thus prepared comparative aqueous ink composition were:

| | | |
|---|---|---|
| pH = 10.1 | (25° C.) | |
| Viscosity = 2.05 cP | (25° C.) | |
| Surface tension = 51.8 dynes/cm | (25° C.) | |

Examples 17 through 24 and Comparative Examples 8 through 11 were subjected to the same ink droplet ejection response tests as were done in Example 16. With respect to Example 17 through 24, the same excellent results were obtained as in Example 16. However, in Comparative Examples 8 through 14, the nozzles became partially clogged when the apparatus and ink composition were allowed to stand at normal room temperature and humidity for one week, and when the apparatus and ink composition were allowed to stand at 40° C./30%RH for 3 days, so that the direction of ejected ink droplets became extremely unstable and normal ink-jet printing was impossible.

EXAMPLE 25

A mixture of the following components was heated to 50° C. and stirred until completely dissolved. The mixture was then filtered through a Teflon filter with a 0.22 μm mesh to yield an embodiment No. 20 of an aqueous ink composition according to the present invention:

| | wt. % |
|---|---|
| Dye C1 | 3.0 |
| Glycerin | 5.0 |
| Diethylene glycol | 13.0 |
| Sodium dehydroacetate | 0.2 |
| Ion-exchanged water | 78.8 |

The properties of the thus prepared aqueous ink composition were:

| | | |
|---|---|---|
| pH = 10.0 | (25° C.) | |
| Viscosity = 2.10 cP | (25° C.) | |
| Surface tension = 50.5 dynes/cm | (25° C.) | |

This aqueous ink composition was then subjected to the following performance tests:

(1) Image Clarity and Image Dryness Test

The ink composition was caused to issue from a nozzle with an inner diameter of 30 μm, with vibrations at a frequency of 100 KHz, by which vibrations the ink composition was ejected in a stream broken into individual drops, and was then caused to impinge on commercially available high quality paper. As a result, clear images were obtained on the paper. The time required for drying the printed image was not more than 10 seconds at normal room temperature and humidity.

(2) Preservability Tests

Samples of the ink composition were tightly sealed in glass containers and subjected to the following storage tests:
a. Preserved for 1 month at −20° C.;
b. Preserved for 1 month at 4° C.;
c. Preserved for 1 year at 20° C. and
d. Preserved for 1 week at 90° C.

Separation of precipitates from the ink composition was not observed at all in storage. In addition, no changes were detected in the properties or color of the ink composition.

(3) Ink Droplet Ejection Stability Test

The ink-jet printing as was done in the above described Image Clarity and Image Dryness Test was continuously performed for 1,000 hours. There was no evidence of either clogging of the nozzle or change in ejection direction of the ink droplets; rather, stable printing was maintained.

(4) Ink Droplet Ejection Response Test

After ink-jet printing was performed as outlined in (1), the apparatus and ink composition were allowed to stand for two months at room temperature and humidity, after which they were used again to perform ink-jet printing under the same conditions as previously stated in (1). As in (3) above, there was no change in the ink droplet ejection stability.

The above test was repeated in the same manner, except that the apparatus and ink composition were allowed to stand for one week at 40° C., 30% RH, instead of being allowed to stand for one month at room temperature and humidity. The result was that again no change was observed in the ink droplet ejection stability.

EXAMPLE 26

With the following formulation, an embodiment No. 26 of an aqueous ink composition according to the present invention was prepared by the same procedure as in Example 25.

| | wt. % |
|---|---|
| Dye C2 | 3.5 |
| Glycerin | 5.0 |
| Diethylene glycol | 13.0 |
| Sodium dehydroacetate | 0.2 |

-continued

| | wt. % |
|---|---|
| Ion-exchanged water | 78.3 |

The properties of the thus prepared aqueous ink composition were:

| pH = 10.0 | (25° C.) |
|---|---|
| Viscosity = 2.18 cP | (25° C.) |
| Surface tension = 50.0 dynes/cm | (25° C.) |

EXAMPLE 27

With the following formulation, an embodiment No. 27 of an aqueous ink composition according to the present invention was prepared by the same procedure as in Example 25.

| | wt. % |
|---|---|
| Dye C4 | 4.0 |
| Glycerin | 5.0 |
| Diethylene glycol | 13.0 |
| Sodium dehydroacetate | 0.2 |
| Ion-exchanged water | 77.8 |

The properties of the thus prepared aqueous ink composition were:

| pH = 10.1 | (25° C.) |
|---|---|
| Viscosity = 2.15 cP | (25° C.) |
| Surface tension = 51.2 dynes/cm | (25° C.) |

EXAMPLE 28

With the following formulation, an embodiment No. 28 of an aqueous ink composition according to the present invention was prepared by the same procedure as in Example 25.

| | wt. % |
|---|---|
| Dye C5 | 3.0 |
| Polyethylene glycol 200 | 15.0 |
| Triethylene glycol monomethyl ether | 3.0 |
| p-Ethoxybenzoic acid | 0.2 |
| Ion-exchanged water | 78.8 |

The properties of the thus prepared aqueous ink composition were:

| pH = 9.5 | (25° C.) |
|---|---|
| Viscosity = 2.25 cP | (25° C.) |
| Surface tension = 48.6 dynes/cm | (25° C.) |

EXAMPLE 29

With the following formulation, an embodiment No. 29 of an aqueous ink composition according to the present invention was prepared by the same procedure as in Example 25.

| | wt. % |
|---|---|
| Dye C6 | 3.5 |
| Polyethylene glycol 200 | 15.0 |
| Triethylene glycol monomethyl ether | 3.0 |
| p-Ethoxybenzoic acid | 0.2 |
| Ion-exchanged water | 78.3 |

The properties of the thus prepared aqueous ink composition were:

| pH = 9.5 | (25° C.) |
|---|---|
| Viscosity = 2.24 cP | (25° C.) |
| Surface tension = 49.0 dynes/cm | (25° C.) |

EXAMPLE 30

With the following formulation, an embodiment No. 30 of an aqueous ink composition according to the present invention was prepared by the same procedure as in Example 25.

| | wt. % |
|---|---|
| Dye C11 | 4.0 |
| Polyethylene glycol 200 | 15.0 |
| Triethylene glycol monomethyl ether | 3.0 |
| p-Ethoxybenzoic acid | 0.2 |
| Ion-exchanged water | 77.8 |

The properties of the thus prepared aqueous ink composition were:

| pH = 10.1 | (25° C.) |
|---|---|
| Viscosity = 2.15 cP | (25° C.) |
| Surface tension = 51.0 dynes/cm | (25° C.) |

COMPARATIVE EXAMPLE 12

With the following formulation, a comparative ink composition No. 12 was prepared by the same manner as in Example 25.

| | wt. % |
|---|---|
| Dye (C.I. Direct Yellow 27) | 3.0 |
| Glycerin | 5.0 |
| Diethylene glycol | 13.0 |
| Sodium dehydroacetate | 0.2 |
| Ion-exchanged water | 78.8 |

The properties of the thus prepared comparative aqueous ink composition were:

| pH = 10.2 | (25° C.) |
|---|---|
| Viscosity = 2.15 cP | (25° C.) |
| Surface tension = 51.4 dynes/cm | (25° C.) |

COMPARATIVE EXAMPLE 13

With the following formulation, a comparative ink composition No. 13 was prepared by the same procedure as in Example 25.

| | wt. % |
|---|---|
| Dye (C.I. Direct Yellow 33) | 3.5 |
| Glycerin | 5.0 |
| Diethylene glycol | 13.0 |

-continued

| | wt. % |
|---|---|
| Sodium dehydroacetate | 0.2 |
| Ion-exchanged water | 78.3 |

The properties of the thus prepared comparative aqueous ink composition were:

| pH = 10.2 | (25° C.) |
|---|---|
| Viscosity = 2.28 cP | (25° C.) |
| Surface tension = 51.6 dynes/cm | (25° C.) |

COMPARATIVE EXAMPLE 14

With the following formulation, a comparative ink composition No. 14 was prepared by the same procedure as in Example 25.

| | wt. % |
|---|---|
| Dye (C.I. Direct Yellow 88) | 3.0 |
| Polyethylene glycol 200 | 15.0 |
| Triethylene glycol monomethyl ether | 3.0 |
| p-Ethoxybenzoic acid | 0.2 |
| Ion-exchanged water | 78.8 |

The properties of the thus prepared comparative aqueous ink composition were:

| pH = 10.1 | (25° C.) |
|---|---|
| Viscosity = 2.18 cP | (25° C.) |
| Surface tension = 52.0 dynes/cm | (25° C.) |

COMPARATIVE EXAMPLE 15

With the following formulation, a comparative ink composition No. 15 was prepared by the same procedure as in Example 25.

| | wt. % |
|---|---|
| Dye (C.I. Acid Yellow 99) | 3.5 |
| Polyethylene glycol 200 | 15.0 |
| Triethylene glycol monomethyl ether | 3.0 |
| p-Ethoxybenzoic acid | 0.2 |
| Ion-exchanged water | 78.3 |

The properties of the thus prepared comparative aqueous ink composition were:

| pH = 10.2 | (25° C.) |
|---|---|
| Viscosity = 2.05 cP | (25° C.) |
| Surface tension = 52.5 dynes/cm | (25° C.) |

Examples 26 through 30 and Comparative Examples 12 through 15 were subjected to the same ink droplet ejection response tests as were done in Example 25. With respect to Example 26 through 30, the same excellent results were obtained as in Example 25. However, in Comparative Examples 12 through 15, the nozzles became partially clogged when the apparatus and ink composition were allowed to stand at normal room temperature and humidity for one week, and when the apparatus and ink composition were allowed to stand at 40° C./30% RH for 3 days, so that the direction of ejected ink droplets became extremely unstable and normal ink-jet printing was impossible.

What is claimed is:

1. An aqueous ink composition comprising an aqueous solution of a water-soluble first dye component and a humectant dissolved in water, said first dye component being at least one dye selected from the group consisting of a cyan azo dye of formula (I), a magenta azo dye of formula (II), and a yellow azo dye of formula (III);

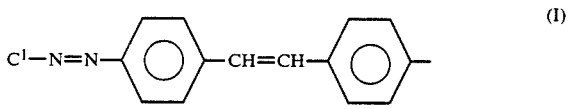

(I)

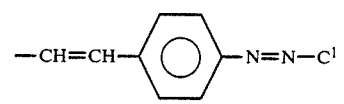

wherein $C^1$ represents

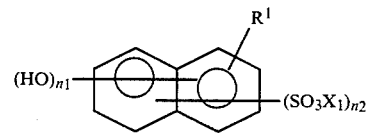

wherein $R^1$ represents hydrogen, an unsubstituted or substituted amino group, a sulfo-group-substituted alkyl carbamoyl group, a sulfo-group-substituted phenyl carbamoyl group or a sulfo-group-substituted naphthyl carbamoyl group; $X^1$ represents hydrogen, Na, K, Li or an organic amine; $n_1$ is an integer of 1 or 2; and $n_2$ is an integer of 0 through 3;

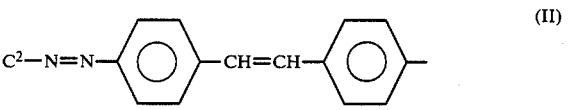

(II)

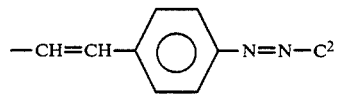

wherein $C^2$ represents

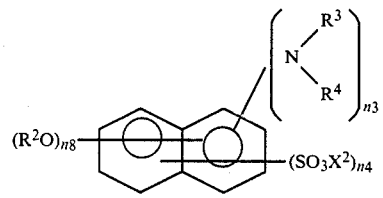

or

-continued

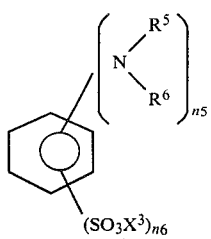

wherein $R^2$ represents hydrogen or an alkyl group; $R^3$ and $R^4$ independently represent hydrogen, an alkyl group, an acyl group, an unsubstituted or substituted phenyl group, or an unsubstituted or substituted phenylsulfonyl group; $R^5$ and $R^6$ independently represent hydrogen or an alkyl group; $X^2$ and $X^3$ independently represent hydrogen, Na, K, Li or an organic amine; $n_3$, $n_5$ and $n_6$ each are an integer of 1 or 2; $n_8$ is an integer of 0 or 1; and $n_4$ is an integer of 1 through 3; and

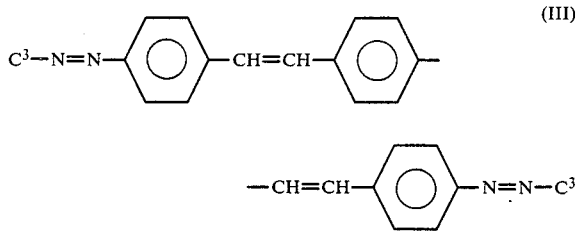
(III)

wherein $C^3$ represents

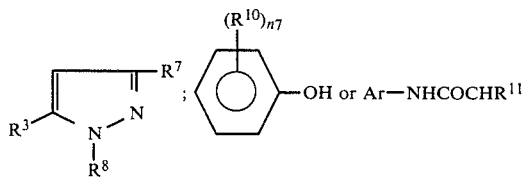

wherein $R^7$ represents an alkyl group, an unsubstituted or substituted phenyl group, a cyano group, a hydroxyl group, an alkoxy group, an amino group, an acylamino group, an anilino group, an ureido group, a carbamoyl group, a carboxyl group or an alkyl ester of a carboxyl group; $R^8$ represents an alkyl group or an unsubstituted or substituted phenyl group; $R^9$ represents a hydroxyl group or an amino group; $R^{10}$ represents hydrogen, an alkyl group, an alkoxy group, a hydroxyl group, halogen or a carboxyl group; $R^{11}$ represents an acetyl group, a benzoyl group, a carboxyl group, an alkyl ester of a carboxyl group, a cyano group, or an amido group; Ar represents a sulfo- group-substituted phenyl group or naphthyl group; and $n_7$ is an integer of 0 through 3.

2. An aqueous ink composition as claimed in claim 1, wherein the amount of said first dye component is in the range of 0.5 to 5 parts by weight with respect to 100 parts by weight of said aqueous ink composition.

3. An aqueous ink composition as claimed in claim 1, further comprising at least one second dye component selected from the group consisting of a black dye, a second cyan dye, a second magenta dye and a second yellow dye, which are different from said first dye component.

4. An aqueous ink composition as claimed in claim 1, wherein said humectant is at least one compound selected from the group consisting of polyhydric alcohols and ethers thereof, and the amount of said humectant is in the range of 5 to 30 parts by weight with respect to 100 parts by weight of said aqueous ink composition.

5. An aqueous ink composition as claimed in claim 1, further comprising an anti-mold agent.

6. An aqueous ink composition as claimed in claim 3, wherein said second black dye is selected from the group consisting of C.I. Direct Black $-2$, $-4$, $-17$, $-19$, $-22$, $-32$, $-38$, $-51$, $-56$, $-62$, $-71$, $-74$, $-75$, $-77$, $-105$, $-108$, $-112$ and $-154$; and C. I. Acid Black $-1$, $-2$, $-7$, $-24$ and $-94$.

7. An aqueous ink composition as claimed in claim 3, wherein said second cyan dye is selected from the group consisting of C.I. Direct Blue $-1$, $-8$, $-71$, $-76$, $-78$, $-108$, $-163$, $-195$, $-202$, and $-236$; and C.I. Acid Blue $-1$, $-7$, $-126$, $-175$, and $-234$.

8. An aqueous ink composition as claimed in claim 3, wherwein said second magenta dye is selected from the group consisting of C.E. Direct Red $-1$, $-11$, $-37$, $-62$, $-75$, $-83$, $-99$, $-220$ and $-227$; and C.I. Acid Red $-87$, $-92$, $-94$, $-115$, $-131$, $-154$, $-186$ and $-254$.

9. An aqueous ink composition as claimed in claim 3, wherein said second yellow dye is selected from the group consisting of C.I. Direct Yellow $-12$, $-27$, $-33$, $-39$, $-50$, $-58$, $-85$, $-86$, $-88$, $-100$ and $-110$; and C.I. Acid Yellow $-7$, $-17$, $-23$, $-29$, $-42$, and $-99$.

10. An aqueous ink composition as claimed in claim 4, wherein said polyhydric alcohol is selected from the group consisting of ethylene glycol, diethylene glycol, triethylene glycol, propylene glycol, glycerin, polyethylene glycol and thiodiethanol.

11. An aqueous ink composition as claimed in claim 4, wherein said ether of polyhydric alcohol is selected from the group consisting of ethylene glycol monoethyl ether, ethylene glycol monobutyl ether, diethylene glycol monomethyl ether, diethylene glycol monoethyl either diethylene glycol monobutyl ether, triethylene glycol monomethyl ether and triethylene glycol monoethyl ether.

12. An aqueous ink composition as claimed in claim 5, wherein said anti-mold agent is selected from the group consisting of sodium dehydroacetate, 2,2-dimethyl-6-acetoxydioxane-1,3-sodium benzoate, sodium thiosulfate and ammonium thioglycolate.

* * * * *